(12) United States Patent
Jansky

(10) Patent No.: US 7,614,068 B2
(45) Date of Patent: Nov. 3, 2009

(54) PRIORITIZATION OF ELECTRONIC SERVICE GUIDE CAROUSELS

(75) Inventor: Martin Jansky, Espoo (FI)

(73) Assignee: Nokia Corporation, Espoo (FI)

(*) Notice: Subject to any disclaimer, the term of this patent is extended or adjusted under 35 U.S.C. 154(b) by 779 days.

(21) Appl. No.: 11/252,906

(22) Filed: Oct. 18, 2005

(65) Prior Publication Data

US 2006/0242091 A1    Oct. 26, 2006

Related U.S. Application Data

(60) Provisional application No. 60/663,066, filed on Mar. 18, 2005.

(51) Int. Cl.
*G06F 3/00* (2006.01)
*G06F 13/00* (2006.01)
*H04N 5/445* (2006.01)

(52) U.S. Cl. .............. 725/54; 725/39; 725/44; 725/50

(58) Field of Classification Search .......... 725/54, 725/39, 44, 50
See application file for complete search history.

(56) References Cited

U.S. PATENT DOCUMENTS 6,337,715 B1 * 1/2002 Inagaki et al. ............... 348/553
6,570,876 B1 * 5/2003 Aimoto ....................... 370/389
2003/0149979 A1 * 8/2003 Baldwin et al. ............... 725/39
2006/0092867 A1 * 5/2006 Muller et al. .................. 370/312
2007/0240188 A1 * 10/2007 Vermola et al. ................ 725/62

FOREIGN PATENT DOCUMENTS

WO    2004/056096 A1    7/2004

OTHER PUBLICATIONS

Digital Video Broadcasting, "IP Datacast Over DVB-H: Electronic Service Guide (ESG)"DVB Document A099, Nov. 2005.

* cited by examiner

*Primary Examiner*—Nathan J Flynn
*Assistant Examiner*—Jeong S Park
(74) *Attorney, Agent, or Firm*—Ditthavong Mori & Steiner, P.C.

(57) ABSTRACT

Prior art methods of receiving, organizing, and implementing the data transmitted to mobile devices, such as ESG fragments, have a great impact on mobile device performance and battery lifetime. Furthermore, in order to keep server side and client side ESG fragments in synch, any change in content of ESG fragments needs to be indicated. Additionally, any change in how ESG fragments are distributed requires the client side to verify if all the fragments are still available and valid in any new distribution set up and if their content has not changed. Aspects of the invention provide a protocol for prioritizing the ESG fragments to ensure the end user of a destination device receives more pertinent ESG data in a timely manner. Other aspects of the invention minimize the number of updates required on a client side or destination device caused by the re-distribution of the "unchanged" ESG fragments into different carousels.

20 Claims, 13 Drawing Sheets

PRIORITIZATION OF ELECTRONIC SERVICE GUIDE CAROUSELS

PRIORITIZATION OF DATA

The present application claims priority to provisional application Ser. No. 60/663,066 filed Mar. 18, 2005. The disclosure of which is hereby incorporated by reference in its entirety.

FIELD OF THE INVENTION

The invention relates generally to communications networks. More specifically, the invention relates to the signaling of an aggregate of data within a broadcast system.

BACKGROUND OF THE INVENTION

Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetised data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

The present invention, however, is also is applicable to other traditional digital mobile broadcast systems such as, for example, T-DAB, DMB (including T/S-DMB, T-DMB, and DMB-T), ISDB-T, ATSC, MediaFlow, and non-traditional systems such 3GPP MBMS (Multimedia Broadcast/Multicast Services) and 3GPP2 BCMCS (Broadcast/Multicast Service).

As image and other large files predominate the ESG transport, there exists a need to efficiently transport the ESG fragments across the desired networks to the end receivers. Previous systems transmitted a header before the ESG, however, this is quite inefficient because if containers carrying ESGs are transmitted before the header, the information is inaccessible until the header arrives and there is the risk of not receiving the header, thereby rendering the information in the container useless. Current attempts focus on associating several fragments together; however, these attempts have been largely unsuccessful due to the lack of unique identification of the fragments, an efficient header or indexing structure, or requiring the presence of repetitive parameters.

As stated above, the ESG fragments may be transported by IPDC over a network, such as for example, DVB-H to destination devices. The destination device must then again determine the ordering of the ESG fragments and assemble them into useful information. The prior art methods of receiving, organizing, and implementing the ESG fragments has a great impact on mobile device performance and battery lifetime. Furthermore, in order to keep server side and client side ESG fragments in synch, any change in content of ESG fragments needs to be indicated. Additionally, any change in how ESG fragments are distributed across carousels requires the client side to verify if all the fragments are still available and valid in any new distribution set up and if their content has not changed. A result of current systems and proposals is the unnecessary re-distribution of unchanged ESG fragments along with the updated fragments. Lastly, there is not a protocol for prioritizing the ESG fragments to ensure the end user of a destination device receives more pertinent ESG data in a timely manner.

It goes from the forgoing, therefore, there exists a need in the art to minimize the number of updates required on a client side or destination device caused by the re-distribution of the "unchanged" ESG fragments into different carousels. There also appears to be a need to prioritize the ESG fragments and implement a system to ensure the most important ESG fragments are delivered in a timely manner.

BRIEF SUMMARY OF THE INVENTION

Aspects of the present invention allow for the efficient transportation of ESG fragments to a receiver through the formation of containers. In this sense, a container comprises at least one ESG fragment, but may contain a plurality of fragments. Alternatively, a fragment may be carried in more than one container. The containers are transported to the receiver, for example, by using Asynchronous Layer Coding (ALC)/Layered Coding Transport (LCT) such that a single ALC/LCT transport object corresponds to a single container. The fragments can be utilized by the receiver upon reception of the entire container. Aspects of the present invention utilizes a simple and extensible header structure apart from the fragments independent of the type and format of the individual fragments. In further embodiments, compression is applied over the entire container, including the fragments and any headers. In yet further embodiments, other envelopes, e.g. a 3GPP metadata envelope may be carried within the container without the need for unnecessary repetition of parameters, such as for example, version, validity time, and identification.

Metadata within a 3GPP (3rd Generation Partnership Project) envelope or in any other form may include specific channels, specific programs, and/or specific channel bundles. Other types of metadata may include: package data, purchase data, such as operator identity data and technical data for performing the transaction, e.g., an address, protocol, price data which may be based upon package/day, channel/minute, program/minute; channel data, such as a textual description for a user, content provider branding information/logo, classification and rating data, such as genre and parental rating, channel SDP data, such as a description of capabilities needed to use the service, e.g., audio and video format and bit rate information, start and end time, addresses, addresses of synchronized auxiliary data feeds, proprietary extensions; and program data, such as a textual description for a user, start and end times, references for interactive services related to the program. This metadata may be loaded by an operator or may be performed automatically.

Prior art methods of receiving, organizing, and implementing the data transmitted to mobile devices, such as ESG fragments, have a great impact on mobile device performance and battery lifetime. Furthermore, in order to keep server side and client side ESG fragments in synch, any change in content of ESG fragments needs to be indicated. Additionally, any change in how ESG fragments are distributed requires the client side to verify if all the fragments are still available and valid in any new distribution set up and if their content has not changed. Aspects of the invention provide a protocol for prioritizing the ESG fragments to ensure the end user of a destination device receives more pertinent ESG data in a timely manner. Other aspects of the invention minimize the number of updates required on a client side or destination device caused by the re-distribution of the "unchanged" ESG fragments into different carousels.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
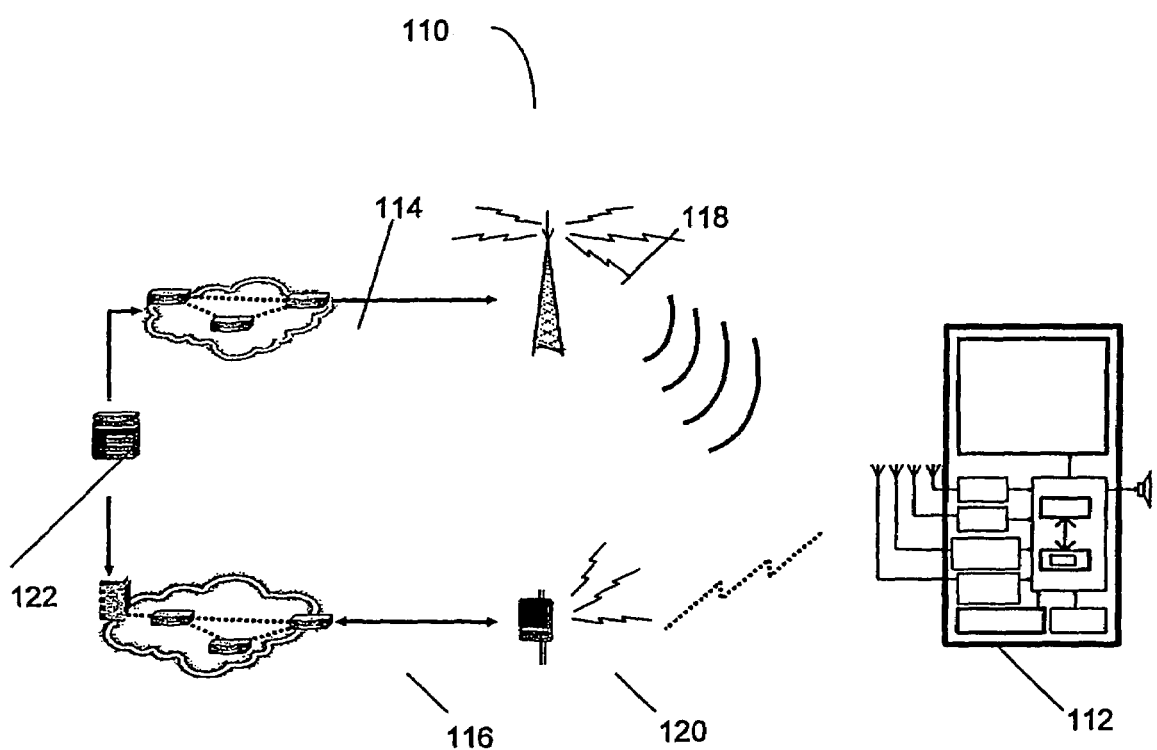
FIG. 1 illustrates a block diagram of a wireless communication system in which various aspects of the present invention may be implemented.

The present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112, which may be used and/or displayed as an electronic service guide for user to select their services and programs. The several service providers may include but are not limited to one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or other messages. As part of cellular network 116, one or more base stations (not shown) may support digital communications with receiver device 112 while the receiver device is located within the administrative domain of cellular network 116.

Figure 2:
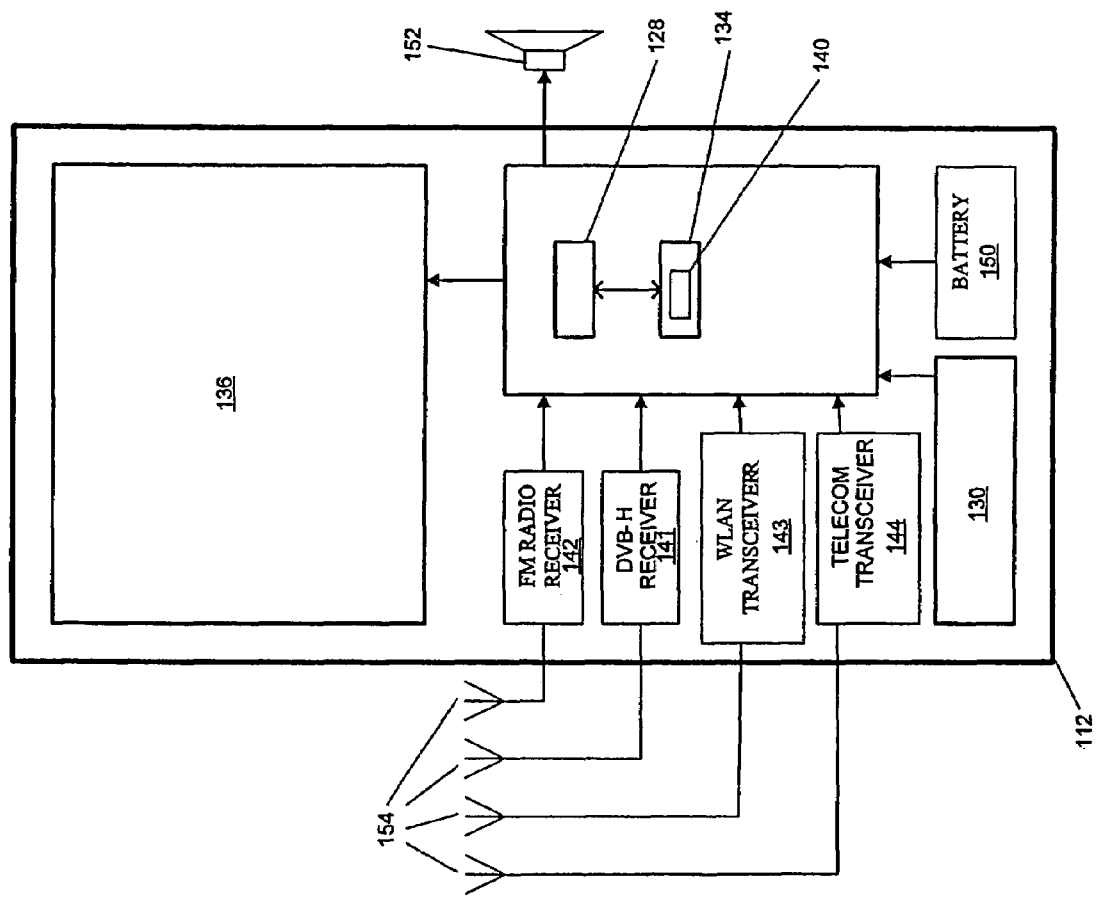
FIG. 2 illustrates a block diagram of a mobile terminal in accordance with an aspect of the present invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, one or more arrow keys, joy-stick, data glove, mouse, roller ball, touch screen, voice interface, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory and optionally being detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process transmissions based on the Digital Video Broadcast (DVB) standard, such as DVB-H or DVB-MHP, through a specific DVB receiver 141. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting, including T/S-DMB, T-DMB, and DMB-T) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Figure 3:
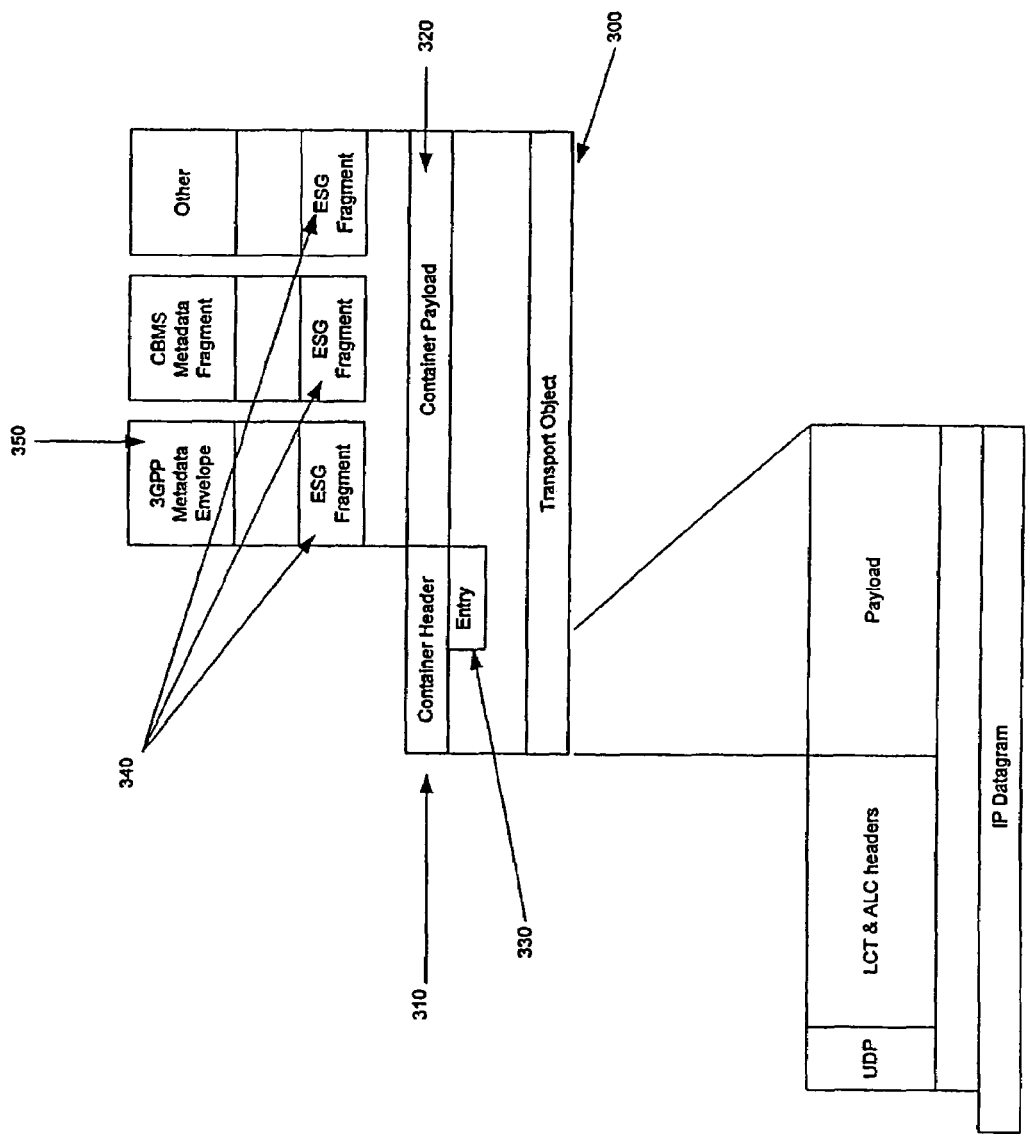
FIG. 3 illustrates a schematic diagram of an example transport object in accordance with an aspect of the present invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In the exemplary embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 120 by providing, for example, an offset value 550, start and end points, or the like. In other embodiments, metadata 350 may be associated with the individual ESG fragments 340, located within or proximate to the header 310, descriptor entries 330, a ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

Figure 4:
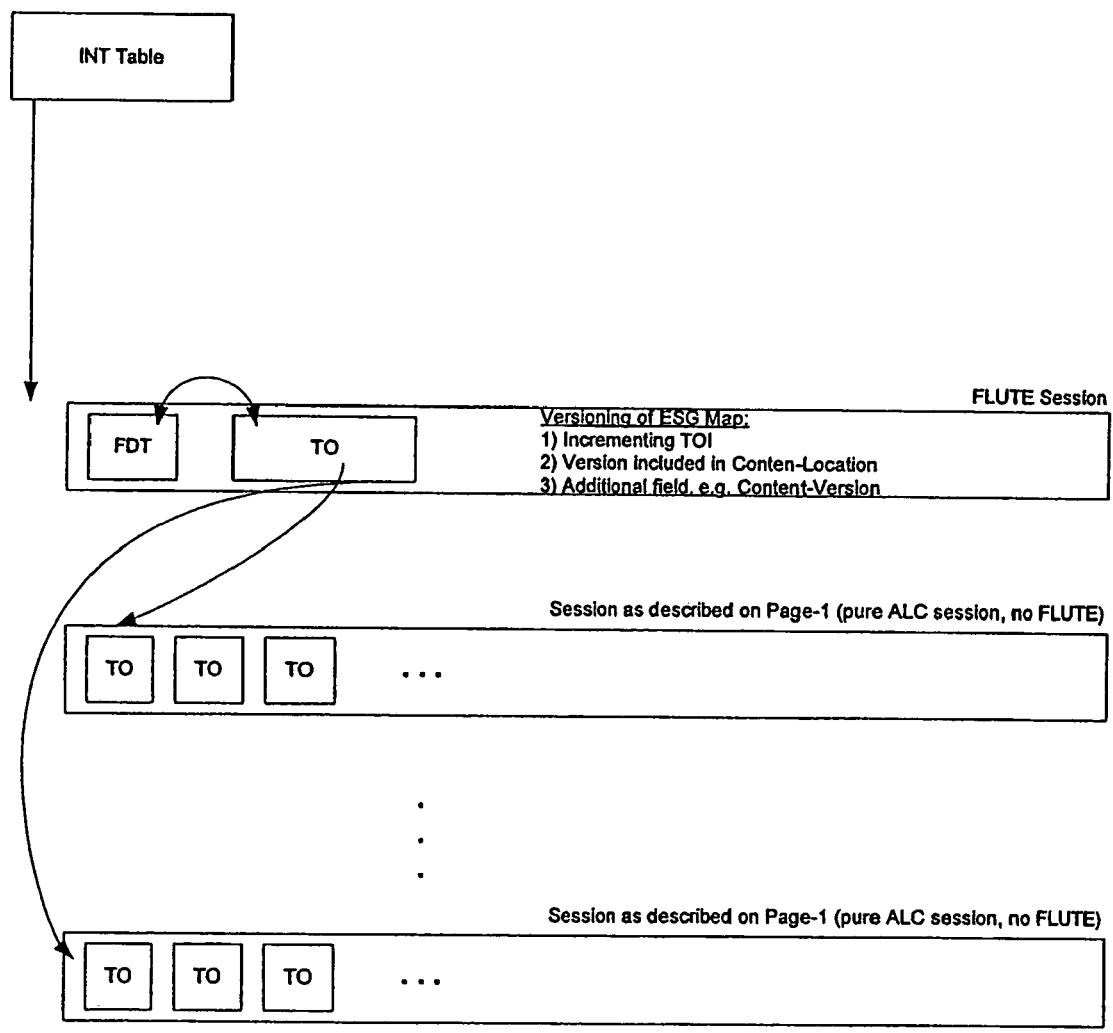
FIG. 4 illustrates a method of transporting a multitude of single object transports in accordance with an aspect of the present invention.

FIG. 4 illustrates a method of transmitting a multitude of single object transports wherein the transports are in accordance with at least one aspect of the present invention. As illustrated in FIG. 4, the transports objects (TO) of the current invention may be carried in, for example, FLUTE (File Delivery over Unidirectional Transport) sessions, or a pure ALC session. In the example of FIG. 4, the ESG Root Channel data, such as IP Address, port number and Transport Session Identifier (TSI), are announced in the IP/MAC Notification Table (INT Table). The FLUTE session of the ESG Root Channel comprises a File Delivery Table of the said session and one or more Transport Objects (TO). These Transport Objects contain mapping between the different types of ESGs and access parameters to the different ESG sessions in which the ESG data is transmitted. The ESGs may differ from each other e.g. as being in different languages and/or having different encoding or genre. The access parameters include IP Addresses, port numbers, TSIs, start and end times etc. The FLUTE session thus declares how the ESG data is distributed to different sessions. The TOs of the FLUTE session carrying this mapping data are described in the FDT of the FLUTE session. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data is in this example delivered in ESG sessions, which may be pure ALC sessions, in one or more TOs. The same ESG data may be delivered in one or more ESG sessions. The ESG data or parts of it may be delivered in some embodiments of the invention in one or more FLUTE sessions in addition to or instead of ALC sessions.

Figure 5:
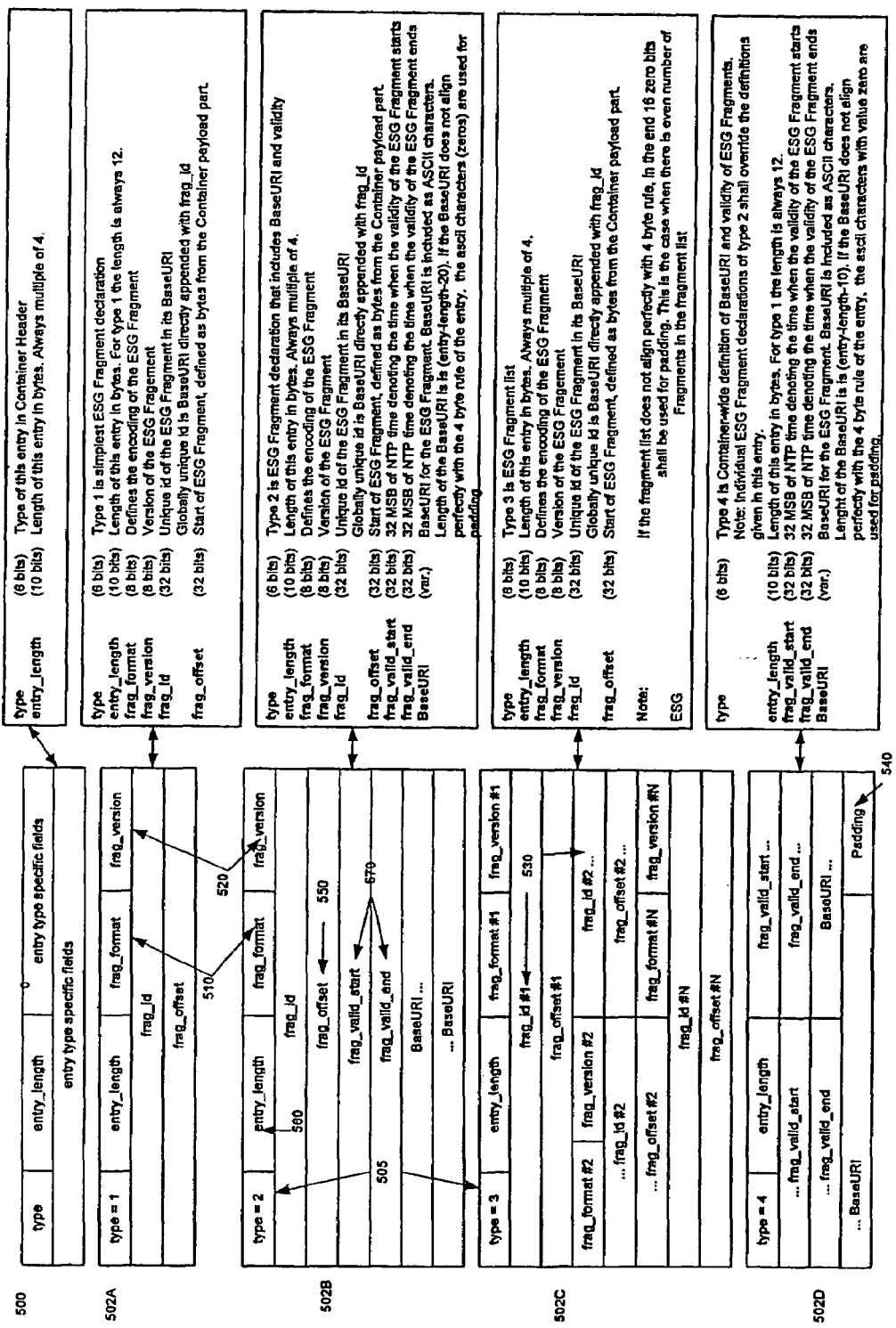
FIG. 5 illustrates a block diagram of exemplary electronic service guide (ESG) fragment descriptor entries in accordance with at least one aspect of the present invention.

FIG. 5 is a block diagram illustrating exemplary frames of electronic service guide (ESG) fragment descriptor entries in accordance with at least one aspect of the present invention. Frame 500 illustrates a format of the protocol frame for a header 310. The frames having descriptor entries 502A-D are exemplary instantiations which include a type field 505 to indicate the type and features of an entry 330. The type field may be extensible to allow for the addition of new types of entries. By inputting an entry type into this field 505, different information is available to the receiver. Frame instantiations 502A-D we have pre-defined specific metadata associated with fragments. For example in 502B, the fields offset, start, end and baseURI are metadata for the corresponding fragment in the payload. Frame instantiation 502C in turn doesn't associate any metadata with the fragment it represents.

As described above, the payload may contain an envelope which associates metadata with the fragment itself (both included in the envelope) or indicate that metadata is located in the header, or alternatively the type is an entry that provides predefined parameters of the ESG fragments located within the payload. Furthermore, as shown by frame 502C, a single descriptor entry may be configured by its type to describe a plurality of ESG fragments, or even different versions of the same ESG fragment. For example, frame 502A is flagged as a type 1 entry, and includes information regarding the ESG fragments such as location, format, version information, a unique identifier. To illustrate this point, frames 502 may provide additional information fields regarding the ESG fragments 340, such as format 510, version 520, and a unique identifier 530. In the exemplary embodiment, the format field 510 specifies whether an ESG fragment 500 is text, a video, and/or a picture. One skilled in the art, however, will realize that the format field 510 could specify virtually any information concerning the type of media contained in the ESG fragment 340.

A version field 520 may be included to allow the updating of previously received ESGs. For example, a newer version of an ESG can be automatically detected and executed, whereas an outdated ESG fragment as specified by the version field 520 may not be executed or may be executed at the discretion of the user of the receiver. This is also often useful where local services are available. For example, when a mobile terminal moves from one geographical area to another geographical area, some services may remain available, some may no longer be available, and some may become available. Therefore, some of the ESG objects are valid in the new geographical area as in the old geographic area. In an embodiment, a terminal may identify those ESG objects which are valid in the new geographic area and may store/cache objects that are no longer valid. In another embodiment, a terminal may receive and store ESG objects from different frequencies, IP platforms, and network operators and then combine these objects with ESG objects from the current network into a unified ESG.

Optionally, a version field 520 may be coupled with or replaced by a validity field 570. While the version field 520 may indicate whether the received ESG fragment is the most current version or is configured to determine if compatibility issues exist, a validity field 570 may further separate useless or less prioritized ESG fragments. As illustrated in FIG. 5, one or more validity fields 570 may indicate time periods at which the associated fragment is valid. Alternatively, validity may be based on the receiver's hardware, user defined settings, and/or the presence of other ESGs. By way of example, the presence of a BaseURI or location where the node was loaded, whether in the validity field 570, or another field, can permit verification of a received ESG fragment. In other embodiments, a BaseURI may allow the receiver to utilize the information located at the URI in conjunction with or in place of the ESG fragment.

A unique identifier field 530 allows for the identification of an ESG fragment irregardless of the information in the container header 310. Such information would, for example, be useful when several ESGs are received, executed, or otherwise no longer associated with the header or otherwise need to be universally identifiable. Each of the above information fields 510, 520, 530, among other utilized fields may optionally contain a padding field 540 to compensate for improper alignment with the byte rules of the entries. For example, if the location of an ESG fragment contains a BaseURI that does not supply enough bits for the entry, ASCII characters, such as zero, may be used to fill the needed spaces to fulfill the bits requirement. As disclosed, each ESG fragment may be coded for a different bit rate than other ESG fragments. In yet further embodiments, different bit rates may be utilized for different parameters within a single ESG, for example, in the different information fields 510, 520, 530.

Location of an ESG fragment may be obtained by utilizing an offset field 550 alone or in conjunction with an entry length field 560, wherein the fragment's offset can be measured from the header, an initial point within the payload, or any other point within the transport object. The fragment offset and length value can be measured in bits, bytes, or any like quantifying system. As previously discussed, fields utilizing different systems (ie. 6 bit, 10 bit, 32 bit) can all be can encoded within the same descriptor entry. Each descriptor entry 500 has a fragment identification field 530 which uniquely identifies the ESG fragment. In the exemplary descriptor entries 500C, 500D, 500E, the BaseURI is appended to the fragment's identification within the payload container to create a globally unique identifier.

Figure 6:
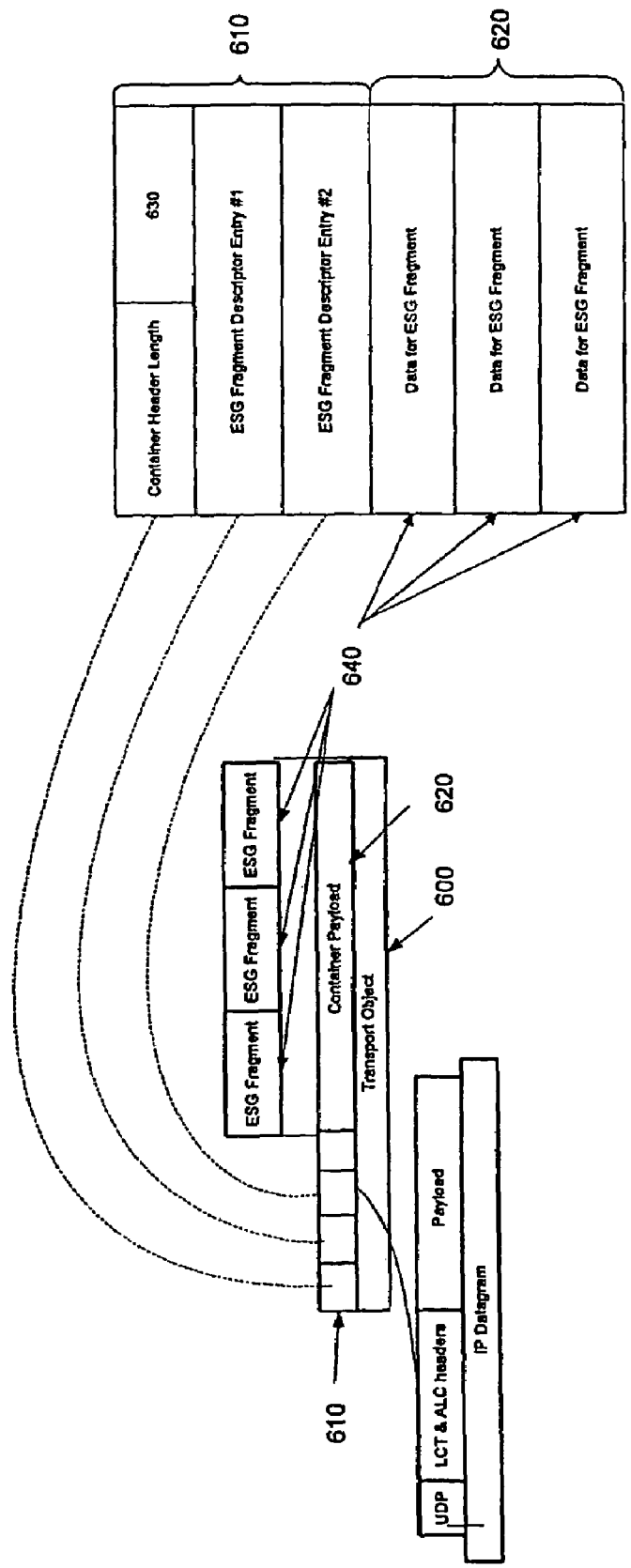
FIG. 6 illustrates a block diagram of an exemplary container having a plurality of ESG objects in accordance with at least one aspect of the present invention.

FIG. 6 illustrates a block diagram of an exemplary container having a plurality of ESG fragments in accordance with at least one aspect of the present invention. The transport object 600 has a container header 610 preceding a container payload 620, together forming a single transport object. The header 610 comprises a coding section regarding the header length 630. The header 610 may optionally contain a signaling mechanism or a transport encoding mechanism that is configured to signal that the transport object or a portion thereof is encoded or otherwise compressed. In one embodiment, an LCT codepoint, located in the beginning of the header 610, can signal that the entire transport including the header is compressed. In other embodiments, a reserve field may comprise a codepoint that signals the encoding for the transport object 600. By way of example, GZIP may be used for this purpose; however, one skilled in the art will recognize that numerous other alternatives will accomplish the goal of compression in this manner. In embodiments having a reserved field, additional information may optionally be included that relates, for example, to the ESGs, the header itself, or additional compression or encoding information. The container payload 620 comprises at least one ESG fragment 640, with some or all of the fragments having metadata (see FIG. 3). In some instances, the fragments do not have metadata, rather any requisite metadata is found in the header 610 associated with the appropriate descriptor entry. The transport object may be stored in a memory at the transmitter, intermediate transmission nodes, and/or in the various receivers.

Figure 7:
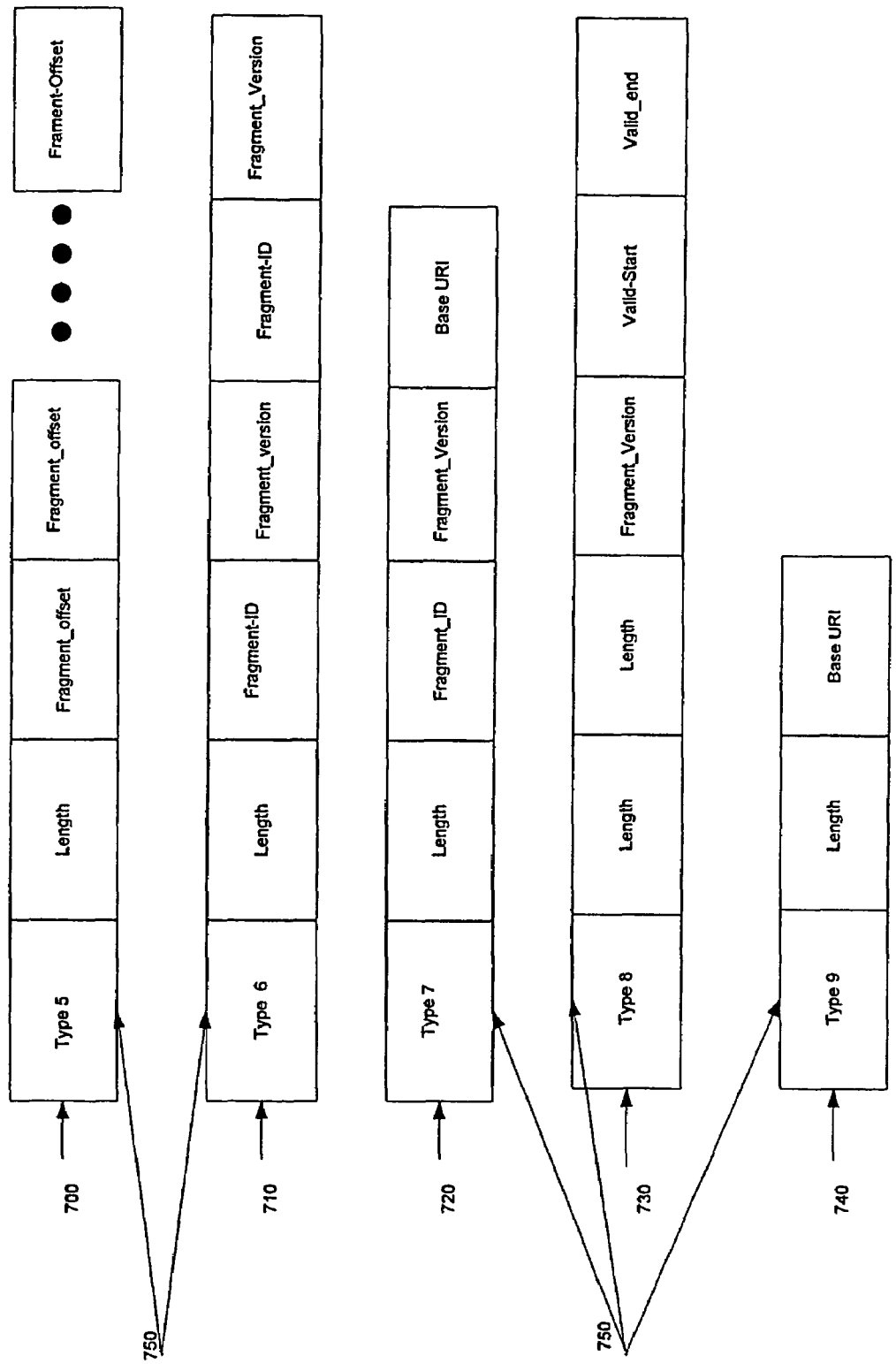
FIG. 7 is a block diagram illustrating further exemplary frames of electronic service guide (ESG) fragment descriptor entries in accordance with at least one aspect of the present invention.

FIG. 7 is a block diagram illustrating further exemplary frames of electronic service guide (ESG) fragment descriptor entries in accordance with at least one aspect of the present invention. The frames 700, 710, 720, 730, and 740 include a type field 750 to indicate the type of frame received. As discussed above, the type field 750 may be extensible to allow for the addition of new types of entries. Frame 700 illustrates a simple ESG descriptor entry that provides the position of ESG fragments in the payload. In the illustrated embodiment, an offset value of the ESG fragment is utilized to locate the fragments.

Frames 710, 720, and 730 illustrate the various types of descriptor entries that do not associate with any container payload. Rather, frames 710, 720, and 730 may be used to validate ESG fragments already received. In further embodiments, such as illustrated by frame 740, the descriptor entry may comprise a declaration of a BaseURI for the entire container.

In yet another aspect, the invention comprises a system and method of using the same to determine whether a newly transmitted container is a valid update of a previously received container without the need to decode or otherwise process the information within the container payload. In at least one embodiment, a transmitter is configured to update numerous fragments as a single unit. The transmitted container may be further configured to mandate all targeted fragments are updated. It yet still another aspect, the invention comprises a system and method of using the same that only requires a single instance of a container type to determine the combination of fragments in each other possible instance of the same type.

Figure 8:
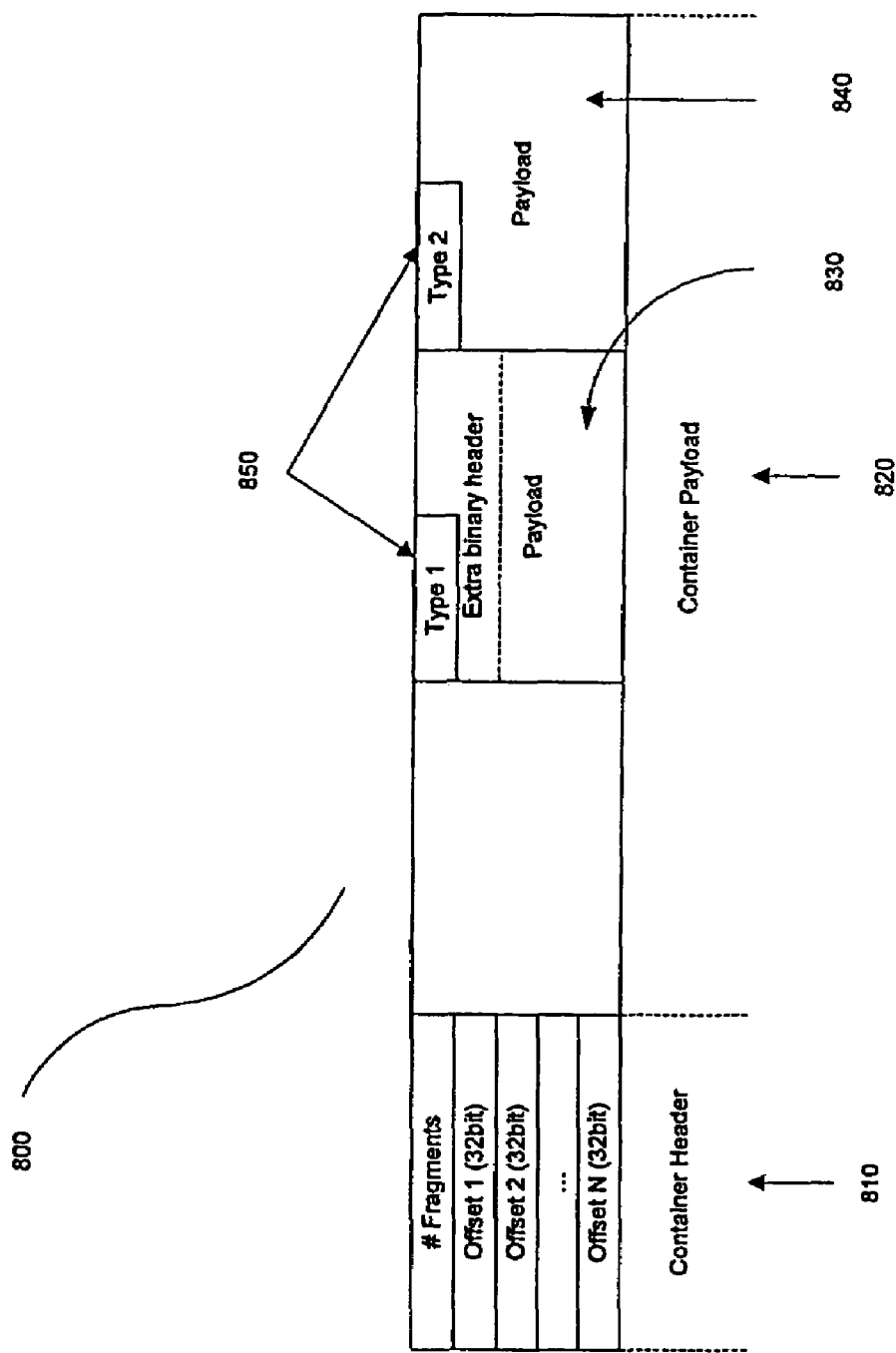
FIG. 8 is a block diagram of a simplified container system in accordance with one embodiment of the present invention configured for the updating of previously received fragments.

FIG. 8 is a block diagram of a simplified container system in accordance with one embodiment of the present invention configured for the updating of previously received fragments. The system is configured to determine whether the newly transmitted container is a valid update without the need to decode or otherwise read the information within the container payload. An update container 800 generally comprises a container header 810 and a container payload 820. In the exemplary embodiment, the header 810 contains information relating the number of fragments in the payload 820 and the associated offset values, however, it is within the scope of the invention to include information relating to the header 810 and/or payload 820. The payload comprises data items 830, 840 having fragment updates. While the embodiment shows two data items, additional data items are contemplated as well as transmitting a single data item. Each data item includes an indication of its type 850.

The container may further indicate the presence of a payload header. For example, a type 1 data item could be a binary envelope having metadata in a header as illustrated, being associated with predetermined fragments. Type 2 may indicate a 3GPP textual envelope associated with different fragments. The metadata therefore, is not fixed on the transport level. In addition to these examples, other container types may be defined.

Figure 9:
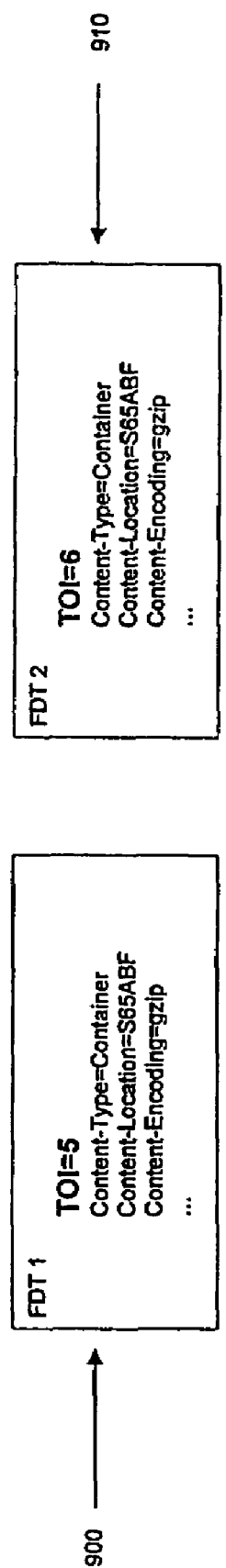
FIG. 9 is a block diagram illustrating the container and fragment management in an updating system in accordance with one embodiment of the invention.

The novel updating system is implemented through the configuration and management of the fragments and container instances. An "instance of fragments" or "fragment instance" concerns a fragment with specific type and version, wherein an "instance of a container" or "container instance" concerns a container holding specific instances of fragments. FIG. 9 is a block diagram illustrating the container and fragment management in an updating system in accordance with one embodiment of the invention. In the exemplary embodiment, File Delivery Tables (FDT) 900 and 910 announce the instantiations of the grouping of fragments. The fragment types in each container type are determined by the receiver when initially receiving the first container instance. All different container instances of the same type use the same signature, for example FDT Content-Location, but a different transfer object identifier (TOI). In the exemplary embodiment, FDT 900 has a TOI=5 and FDT 910 has a TOI=6, thereby indicating a different container instance, however, the Content Type and Content-Location remain unaltered. Two different container instances may have different encoding applied, i.e. they have different Content types. For example a container holding fragments A of version A1 and B of version B1 and a container holding fragments A of version A2 and B of version B2 have the same container type. Additionally, a container holding fragment A (irregardless of the version) will have a distinctly different container type than a container holding fragments A, B and C (of any version). Additional optional fields, such as Content-Encoding can also remain in an unaltered state depending on the transmitter's preference. For example, if textual metadata is utilized, the entire container may be encoded with for example, GZip or other mechanisms known in the art. Alternatively only portions could be encoded.

Figure 10:
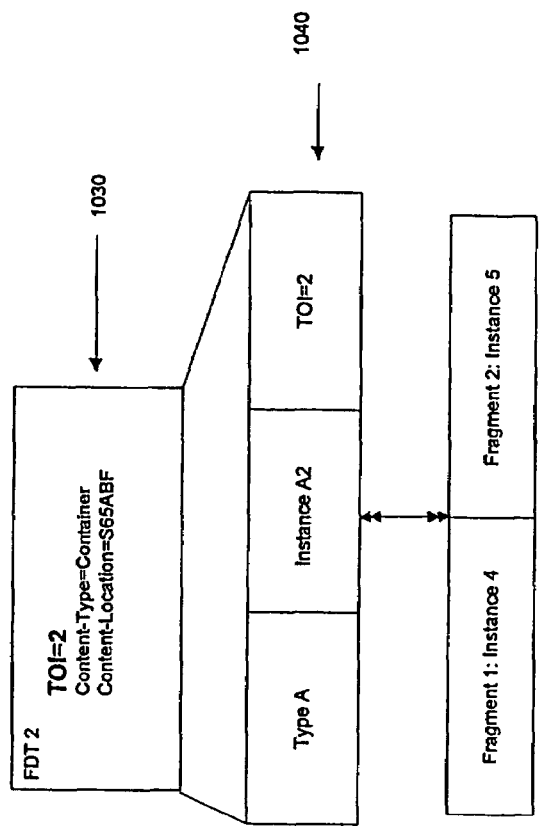
FIG. 10 is a block diagram illustrating a container update performed in accordance with one embodiment of the invention.
Figure 10:
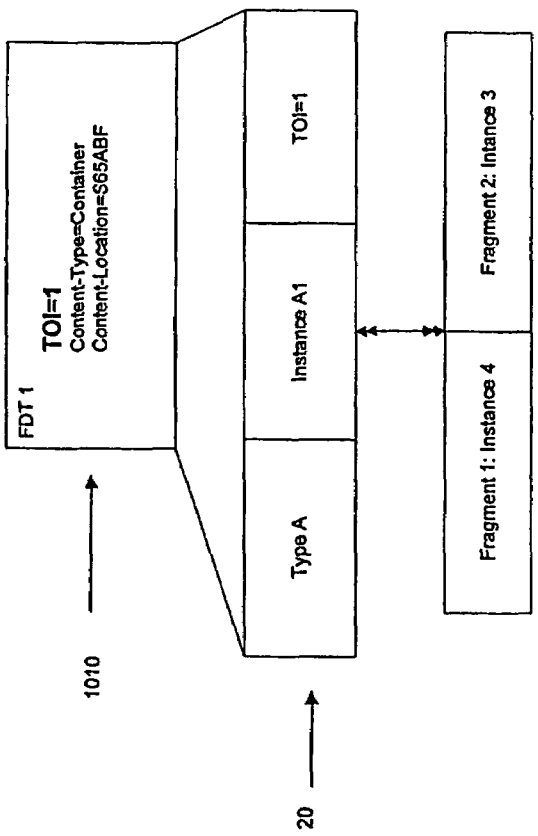

Container encoding and Forward Error Correction (FEC) can be declared by different mechanisms. For example, FDT parameters may declare the encoding mechanism. In one embodiment, the encoding and FEC are declared through the use of LCT extensions. The containers are encoded to enable the receiver to determine if the container is to be decoded and processed without having to access or otherwise read the containers. FIG. 10 is a block diagram illustrating a container update performed in accordance with one embodiment of the invention. In the example, FDT 1010 has a TOI=1 and corresponds to a Type A container 1020 having an instance A1, wherein instance A1 may comprise for example fragment 1: instance 4 and fragment 2: instance 3. The FDT 1010 and the associated container 1020 are received at a terminal, where they are processed or rejected. The File Delivery Table 1030, represents an update to FDT 1010, and is received after the receipt of FDT 1010. FDT still corresponds to a Type A container 1040, however it includes instance A2 in place of instance A1, and may comprise changes such as, for example, fragment 1: instance 4 is not changed, but fragment 2: instance 3 is changed to instance 5. Upon receipt, the terminal determines that instance A2 includes one or more fragment updates as compared to instance A1. The terminal may further determine that A2 contains the same type of fragments as A1. In one embodiment, the terminal further determines, based on a myriad of factors, whether A2 is to be implemented.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips.

Further embodiments of the invention relates to broadcasting and updating the ESG fragments. As previously discussed, one way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

Figure 11:
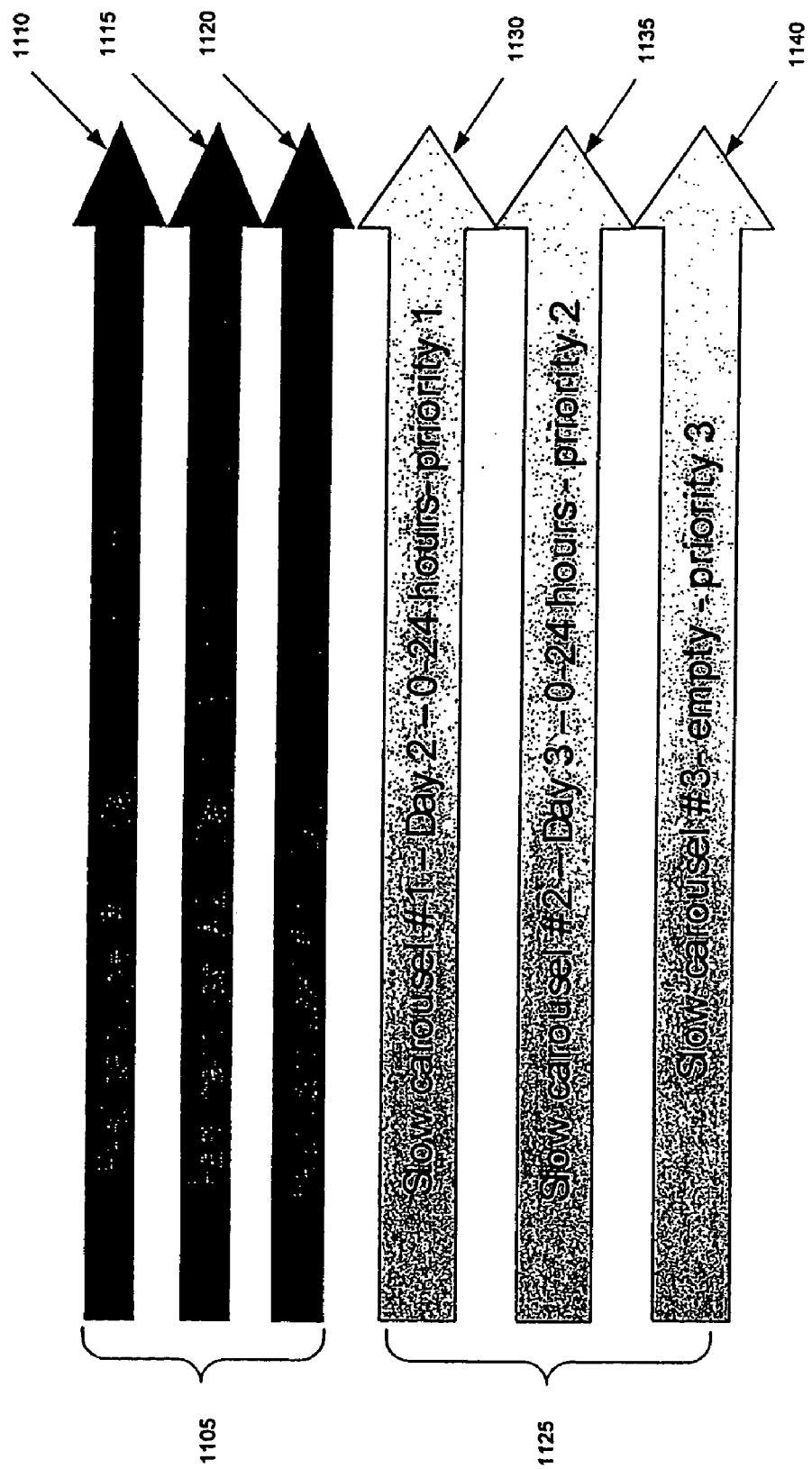
FIG. 11 illustrates the use of prioritizing information to transport ESG carousels in accordance with one embodiment of the invention.

FIG. 11 illustrates one embodiment of an improved system of arranging ESG fragments for transport. The transport by be through numerous digital mobile broadcast systems such as, for example, T-DAB, T/S-DMB, ISDB-T, ATSC, MediaFlow, and non-traditional systems such 3GPP MBMS (Multimedia Broadcast/Multicast Services) and 3GPP2 BCMCS (Broadcast/Multicast Service). Prior art methods of receiving, organizing, and implementing the ESG fragments results in adverse performance and efficiency of mobile devices and battery lifetime. Furthermore, in order to keep server side and client side ESG fragments in synch, any change in content of ESG fragments needs to be indicated. Additionally, any change in how ESG fragments are distributed across carousels requires the client side to verify if all the fragments are still available and valid in any new distribution set up and if their content has not changed. A result of current systems and proposals is the unnecessary re-distribution of unchanged ESG fragments along with the updated fragments. Lastly, there is not a protocol for prioritizing the ESG fragments to ensure the end user of a destination device receives more pertinent ESG data in a timely manner.

As shown in FIG. 11, ESG fragments are arranged in a series of repeating "carousels" to transmit the fragments from a server side to a client side or destination device. For example, one transport protocol, File DeLivery over Unidirectional Transport ("FLUTE") transmits ESG fragments to receiver(s) over unidirectional systems, in a manner suitable for wireless and point-to-multipoint (broadcast or multicast) systems. FIG. 11 illustrates one embodiment of the present invention where the arrangement of ESG fragments may be through the use of prioritizing information describing, for example, a time frame and sub-time frame of the ESG fragments.

As illustrated in FIG. 11, the arrangement of ESG fragments may be through the use of prioritizing information describing, for example, a time frame and sub-time frame of the ESG fragments. The figure shows two series of ESG carousels (1105, 1125) which have been arranged on the server side. The series of carousels 1105, 1125 have been arranged and associated in part, by a first level of priority. In the exemplary embodiment, the first level of priority is determined by a time descriptor associated with the series 1105, 1125. For example, series 1105 comprises carousels having ESG fragments relating to "Day 1", wherein series 1125 comprises carousels having ESG fragments relating to "Day 2" or "Day 3". Therefore, series 1105 may have a First Level of Priority=1 and series 1125 has a First Level of Priority=2.

While the series in the exemplary embodiment comprise three days of information, one skilled in the art will appreciate that in other embodiments ESG fragments may be available for a longer time period, such as TV program listing information. In such embodiments, multiple series of carousels, each having a different first level of prioritization may be desired. In yet further embodiments, the time frame (the exemplary first level of priority) may include only a portion of the ESG fragments available for broadcasting or distribution. This would be especially advantageous in broadcasting to mobile devices which may not have the memory or bandwidth to receive large transmissions of ESG fragments.

Additionally, it is generally understood that the fewer ESG fragments within a carousel, the faster the contents of the carousel may be transmitted to an end user or device. In the exemplary embodiment; series 1105 comprises "fast carousels" in that they are able to transmitted in relatively shorter periods of time in relation to slower carousels (described below) because they contain less ESG fragments. For example, each carousel in series 1105 comprises ESG fragments correlating to 8 hours of programming information, whereas slower carousels in series 1125, as described below, comprise ESG fragments correlating to 24 hours of programming information. Therefore, in other embodiments, a level of priority value could be determined in whole, or in part, by the length of the ESG fragments within a carousel. One skilled in the art will appreciate that the first level of prioritization (as well as additional levels of prioritization) may be based upon a multitude of factors, such as, for example, information an end user is more likely to require or utilize.

Furthermore, as shown in the figure, series 1105 comprises individual FLUTE sessions comprising carousels 1110, 1115, 1120. In the exemplary embodiment, the FLUTE sessions each comprise one carousel (therefore may be referred to as carousels 1110, 1115, and 1120, respectively), however, in other embodiments a plurality of carousels may be included in each FLUTE session. The individual FLUTE sessions (carousels) 1110, 1115, 1120 are arranged by a second level of prioritization. In the exemplary embodiment, the second level of priority value is based upon a time descriptor associated with the carousel or FLUTE session. As illustrated in the figure, carousel 1110 is labeled as "Fast carousel #1" and describes the first 8 hours of Day 1. Carousel 1110, therefore, is assigned a higher level of priority than "Fast carousel #2" (1115), which describes hours 8-16 of the same day. Similarly, session 1115 is assigned a higher priority than "Fast carousel #3" (session 1120) which comprises ESG fragments relating to the last 8 hours of Day 1.

FLUTE session set 1125 comprises sessions (carousels) 1130, 1135, 1140. As explained above, due to having a First Level of Priority=2, the session series 1125 is arranged to be transmitted after, or with less priority, than the carousels of session series 1105 because the ESG fragments in carousels 1130, 1135, 1140 comprise ESG fragments for a later time frame. Like the sessions in series 105, the individual carousels of series 1125 are arranged by a second level of prioritization. For example, carousel 1130 comprises ESG information relating to Day 2, whereas carousel 1135 comprises ESG information relating to Day 3. As explained in more detail below, the use of prioritizing allows for updating specific carousels without having to update all the carousels.

Figure 12:
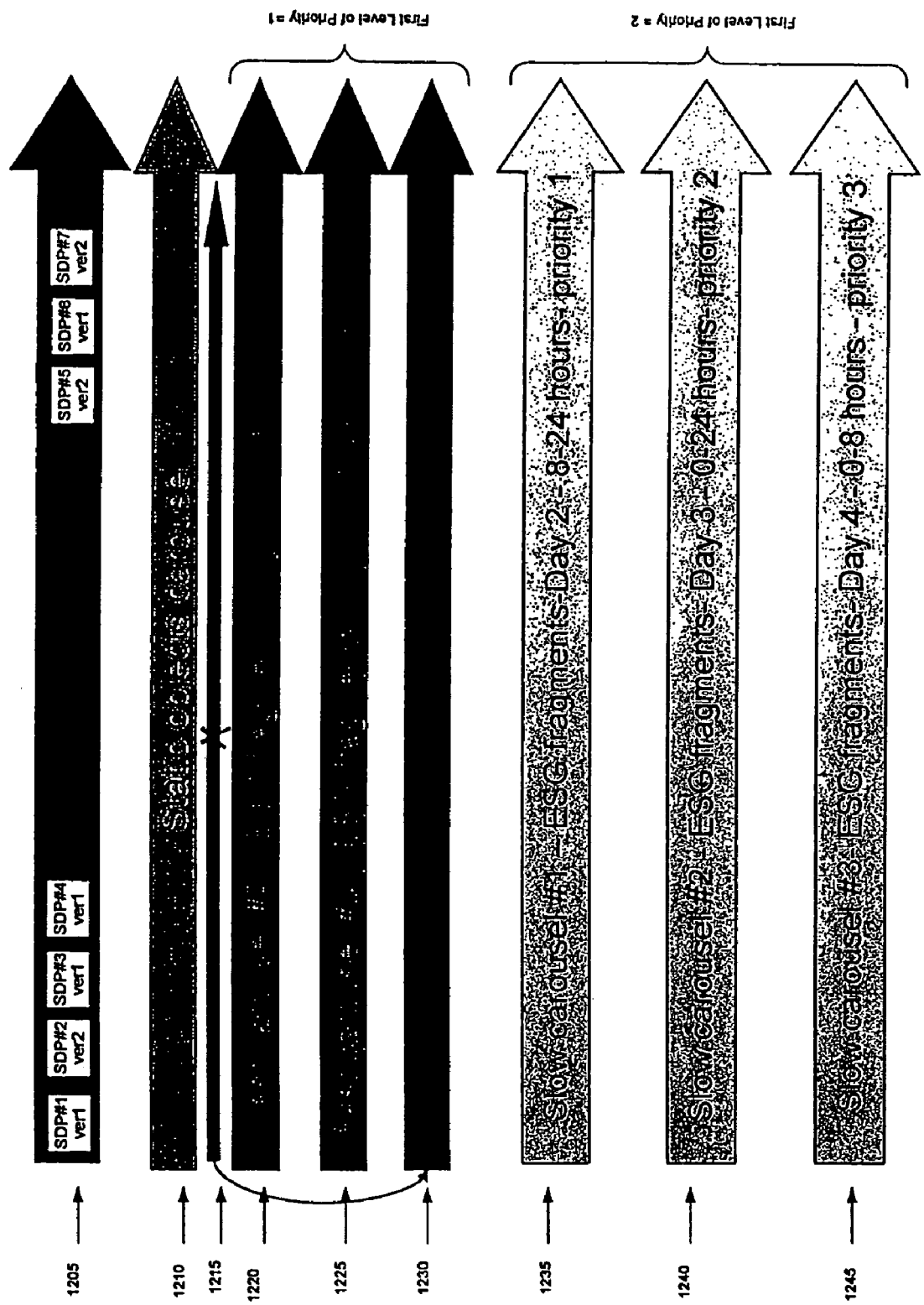
FIG. 12 illustrates one embodiment of the invention in which illustrates the updating of ESG carousels.

FIG. 12 illustrates one embodiment of the invention in which illustrates the updating of the carousels. An announcement carousel 1205 is transmitted to an end user or device. The announcement carousel 1205 provides information to the end user or device of any changes in the carousels. In the exemplary embodiment, the announcement carousel comprises a series of Session Description Protocols (SDP) to indicate the changes in the carousels. For example, SDP#1 in the announcement carousel 1205 indicates the announcement carousel is followed by an optional static objects carousel 1210. The static objects carousel distributes objects that are "static" by nature, and therefore are not likely to be updated or altered for extended periods of time. Such exemplary objects may comprise, for example, subscription information, logos, or main introductory instructions.

FIG. 12 illustrates the updating of carousels, such as those in FIG. 1, upon the passing of an 8 hour time period. An announcement carousel 1205 is provided to indicate carousel 1215 (carousel 1110 in FIG. 11) is no longer relevant (see SDP#2; indicating a different version is available). For example, carousel 1215 previously provided ESG fragments comprising information for the proceeding 8 hours which is no longer relevant upon the passing of that specified time period. Carousel 1220, comprising ESG fragments regarding the next 8 hours, becomes the highest priority based upon its designation of first and second level priority values. Similarly, carousel 1225 then becomes the second most prioritized carousel in series 1105. Since the exemplary embodiment may announces three "fast" carousels (i.e. short carousels comprising 8 hours of programming information for that given day), a new carousel may be loaded into the "bottom" position of the carousels in that series upon the removal of carousel 1215. For example, the new carousel may have a Level of First Priority=1, Level of Second Priority=3.

In one embodiment, a carousel that is currently located in another series is loaded, for example, a carousel having a lower level of first priority. In such an embodiment, a carousel having ESG fragments comprising information for another day (i.e. series 1125) may be loaded into the position of the "bottom" position of series 1105. In the exemplary embodiment, a carousel having a different first level of priority (1130, having a First Level of Priority=2) is divided into a plurality of individual carousels, in which at least one of the newly created carousels is redesignated as "fast". In the exemplary embodiment, carousels 1230 and 1240 are created from carousel 1130. Previously, carousel 1130 was a slow carousel (First Level Priority=2) which comprised ESG fragments having information relating to all 24 hours of Day 2. New carousel 1230 comprises ESG fragments relating to the first 8 hours of Day 2. Since carousel 1230 only has ESG fragments corresponding to 8 hours of programming, the carousel is designated as "fast" and reclassified as having a First Level Priority=1. Carousel 1230 is then placed in the "bottom" position (below carousels 1220 and 1225) of the "fast" carousels. It is placed in the bottom position because it has ESG fragments comprising information for a time period following carousels 1220 and 1225. Therefore, carousel 1230 is assigned as Second Level of Priority=3.

In the exemplary embodiment, the remaining ESG fragments from which carousel 1130 was derived remain in "slow" carousel 1235 having a First Level of Priority=2, Second Level of Priority=1. Carousel 1235 is followed by carousels 1240 and 1245 which have ESG fragments comprising information concerning programming for a more distant time period. For example, carousel 1245 comprises ESG fragments for the 24 hours of Day 3, (First Level Priority=2, Second Level Priority=2), whereas carousel 1250 comprises ESG fragments for the first eight hours of Day 4 (First Level of Priority=2, Second Level of Priority=3). As the relevant time periods pass, the ESG fragments describing those time periods are irrelevant and are therefore no longer transmitted. Therefore, as bandwidth become available for an additional "fast" carousel, ESG fragments from the larger "slow" carousels may be parceled into a smaller "fast" carousel. Likewise, a carousel comprising ESG fragments that the user is likely to or required to utilize may be assigned a higher first or second level of prioritization.

As the previous figures illustrate, there is no longer a need to rearrange ESG fragments across carousels to increase their respective delivery priority. Rather, the content of a carousel can determine the shifting of the carousels to higher or lower levels of priority. Therefore, an end user or device may read the individual FLUTE sessions or carousels based upon the first and second level of priorities.

Figure 13:
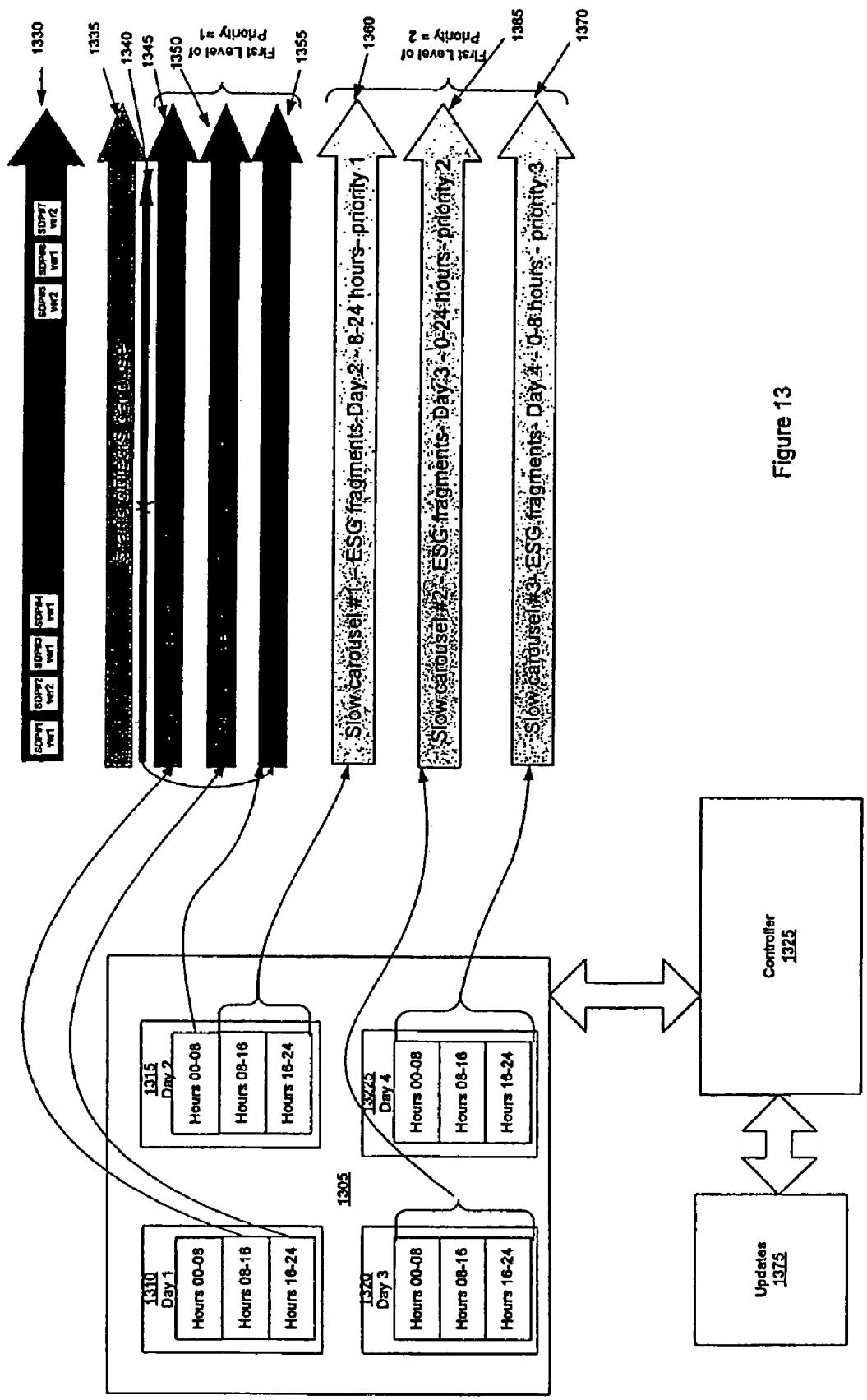
FIG. 13 illustrates an exemplary system of the present invention for updating ESG carousels

FIG. 13 illustrates an exemplary system of the present invention for updating ESG carousels as performed in FIG. 12. A computer readable medium stores a collection of ESG data 1305. The exemplary collection of ESG data 1305 is arranged by the time frame the ESG data relates to. For example, ESG data 1310 comprises carousels relating to electronic service guide information concerning "Day 1", ESG data 1315 comprises carousels relating to electronic service guide information concerning "Day 2". Therefore, ESG data 310 can be referred to as having a First Level Priority value of 1 and ESG data 315 can be referred to as having a First Level of Priority value of 2. Therefore, all the carousels in ESG data 1310 may be prioritized above the ESG data 1315. In one embodiment, however, ESG data having differing First Level Priority values may be simultaneously downloaded or otherwise accessed. In such an embodiment, the higher prioritized data may be allowed more bandwidth to be transmitted. A plurality of additional ESG data, such as ESG data 1320 and 1322, referring to illustrative "Day 3" and "Day 4" respectively, can also be housed within the collection of data 1305.

Each of the exemplary sets of ESG data 1310, 1315, 1320, 1322 are also prioritized according to a second level priority value. As seen in the figure, the second level priority value may determine the order of transmitting carousels within each ESG data 1310, 1315, 1320, 1322. For example, the assigned second level priority value may be obtained from instructions comprising information regarding a time period the programming information within the enclosed ESG fragments refers to. Looking to ESG data 1310, for example, hours 0-8 are prioritized above hours 8-16, which, in turn, are prioritized above hours 16-24. The instructions for assigning the first and second level priority values may be located on any computer readable medium having computer readable instructions for performing the required steps, such as controller 1325.

The controller 1325 also may create an announcement carousel 1330, wherein the announcement carousel 1325 comprises priority information of the ESG carousels (see FIG. 12). The controller may optionally create a static objects carousel 1335, as described above. The controller 1325 may further assign the static object carousel 1335 a higher priority than the ESG carousels within ESG data 1310, 1315, 1320, 1322, however, in other embodiments, the static objects carousel 1335 may not be prioritized above all of the ESG carousels.

In the exemplary embodiment, the carousels are transmitted according to their respective first and second level values as seen in the figure. For example, ESG data series 1310 (having the highest first level priority) is transmitted with a higher priority, as seen by carousels 1340, 1345 and 1350, wherein the second level priority value for each carousel 1340, 1345, and 1350, may be considered when determining the priority for transmitting the carousels. This arrangement allows for an improved system for updating the carousels and less bandwidth dedicated to the updating of the ESG fragments.

In one embodiment, when a carousel is outdated, a new announcement carousel is transmitted, indicating the outdated carousel is no longer being transmitted. For example, after hours 0-8 of Day 1 have lapsed, an announcement carousel, such as announcement carousel 1330 will be transmitted to indicate carousel 1340 is no longer being transmitted. The carousels having the same first level priority value, such as carousels 1345 and 1350 are rearranged based upon their assigned second level priority value, wherein the contents of the carousels 1345, 1350 already within the series are not altered, thereby not requiring the end user or device to check for updates to the enclosed ESG fragments of carousels 1345, 1350. Again, other criteria may be used to select the carousel to receive a higher level of first priority, such as for example, carousels containing ESG fragments more likely to be utilized by the end user or device. The reassignment may be transmitted to the end user or device through an announcement carousel, such as announcement carousel 1330.

A carousel having a different first level priority value from removed carousel 1340 may be reassigned to have the same first level priority value of the removed carousel 1340. In the exemplary embodiment, the carousel having the highest second level priority of the value has been parsed into carousels 1355 and 1360, wherein carousel 1355 is a "fast" carousel comprising 8 hours of programming and having a First Level Priority=1, Second Level Priority=2, and carousel 1360 is a "slow" carousel, comprising the remaining 16 hours of "Day 2" and having a First Level Priority=2, Second Level Priority=1. Although the information for "Day 2" is now divided among two carousels, the ESG fragments remain in the same order, therefore preclude the need to rearrange the ESG fragments and check the validity on the terminal side (an end user or device). Therefore in the exemplary embodiment, updates 1375 may be received by the controller 1325. The controller prioritizes the updates and may store the ESG data in ESG data collection 1305. As previously discussed, the controller 1325 may arrange an announcement carousel 1330 and ESG carousels, 1345-1370 for distribution to an end user or device without rearranging individual ESG fragments among carousels to increase their respective delivery priority. Rather, the content of a carousel can determine the shifting of the carousels to higher or lower levels of priority. Therefore, an end user or device may read the individual FLUTE sessions or carousels based upon the first and second level of priorities.

I claim:

1. A computer readable medium having computer readable instructions that are configured to, with a processor, cause an apparatus to perform at least the following:
    collecting a plurality of ESG fragments;
    arranging the ESG fragments into a plurality of ESG carousels, wherein an ESG carousel will comprise a plurality of associated ESG fragments;
    assigning the ESG carousels a value according to a first level priority utilizing information regarding a time period of programming information within the enclosed ESG fragments wherein carousels having the same value are arranged in a series whereby each carousel in a single series will have the same first level priority value;
    for each series, prioritizing the ESG carousels a value according to a second level priority, wherein the ESG carousels are arranged within each series according to the value of the second level priority;
    creating an announcement carousel, the announcement carousel comprising priority information of the ESG carousels;
    transmitting the announcement carousel and the ESG carousels to a device according to the first and second level priority values, wherein the first level priority value determines the order of transmitting the series, and the second level priority value determines ordering of transmitting carousels within each series;
    when a carousel is outdated, removing the outdated carousel and transmitting an announcement carousel indicating the outdated carousel is no longer being transmitted;
    rearranging the carousels within the series of the removed character carousel to be transmitted based upon their assigned first level priority value, wherein the contents of the carousels already within the series of the removed carousel are not altered; and
    reassigning a carousel having a different first level priority value from the removed carousel to have the same first level priority value of the removed carousel.

2. The instructions of claim 1, wherein assigning the second level priority value comprises information regarding a time period the programming information within the enclosed ESG fragments refers to.

3. The instructions of claim 1, wherein the reassigned carousel is assigned a second level priority value indicating the reassigned carousel is the last carousel in the series to which it has been reassigned to.

4. The instructions of claim 1, further comprising:
    without rearranging the ESG fragments within the reassigned carousel, parsing the located ESG carousel into at least two carousels, wherein at least one parsed carousel is assigned the same first level priority value of the removed carousel.

5. The instructions of claim 1, wherein the determination for the first level priority value comprises information relating to the number of ESG fragments within each carousel of the series.

6. The instructions of claim 1, wherein the determination for the second level priority value comprises information relating to the number of ESG fragments within each carousel of the series.

7. The instructions of claim 1, wherein the announcement carousel further comprises information regarding carousels not having a value assigned in the assigning of the ESG carousels a value according to a first level priority; and further comprising:
    for each series, prioritizing the ESG carousels a value according to a second level priority, wherein the ESG carousels are arranged within each series according to the value of the second level priority.

8. The instructions of claim 7, wherein the announcement carousel further comprises information regarding at least one static objects carousel.

9. A method comprising:
    receiving an announcement carousel at a mobile terminal comprising a processor, a display, and memory, the announcement carousel comprising priority information of available ESG carousels and declaring other ESG carousels, wherein the priority information comprises at least a first level priority value and a second level priority value, wherein carousels having the same first level priority value are determined to be in a series, and the second level priority value determines the priority of the carousels within each series;
    receiving instructions into the memory, wherein the instructions determine the priority of receiving the available ESG carousels;
    initiate receiving at least one ESG carousel of a series according to the instructions;
    receiving a second announcement carousel at the mobile terminal, the announcement carousel comprising priority information indicating at least one carousel is no longer being transmitted and further comprising information that at least one priority value of at least one ESG carousel being transmitted has been updated;

based upon the second level priority value of the remaining ESG carousels, rearranging the ESG carousels within the series of the removed carousel to be prioritized based upon their assigned second level priority value, wherein the lowest, or least prioritized, position in the series to be open; and wherein the contents of the ESG carousels already within the series of the removed carousel are not altered, thereby the repositioned carousels remain static and do not require to be updated;

reassigning at least a portion of an ESG carousel having a different first level priority value from the series of the removed carousel into the lowest position of the series of the removed carousel.

10. The method of claim 9, wherein the reassigning of the at least a portion of an ESG carousel having a different first level priority value includes, without altering the ESG fragments within the reassigned carousel, parsing the located ESG carousel into at least two carousels, wherein at least one parsed carousel is assigned the same first level priority value of the removed carousel.

11. The method of claim 9, wherein the determination for the first level priority value comprises information relating to the number of ESG fragments within each carousel of the series.

12. The method of claim 9, wherein the determination for the second level priority value comprises information relating to the number of ESG fragments within each carousel of the series.

13. The method of claim 9, further comprising:
combining the ESG fragments and displaying an output on the display of the mobile terminal device.

14. A system for transmitting ESG fragments from a transmitter to a mobile receiver, the system comprising:
a service source having a plurality of ESG fragments having programming information stored on a computer readable medium, the computer readable medium further having computer-executable instructions that are configured to cause an apparatus to perform at least the following:
arranging the ESG fragments into ESG carousels and prioritizing the carousels, wherein the arrangement of carousels is determined by at least a first level of priority and a second level of priority, wherein the carousels having the same first level of priority are arranged in a series, wherein at least one level of priority is determined by a time period the programming information within the enclosed ESG fragments refers to; and
creating a first announcement carousel comprising priority information of the ESG carousels, wherein the priority information is determined by at least the first and second level of priority information;
creating a second announcement carousel, wherein the second announcement carousel comprises priority information indicating at least one carousel announced in the first announcement carousel has been removed and no longer being transmitted from the transmitter and further comprising information updating at least one aspect of the priority information of at least one ESG carousel announced in the first announcement carousel;
based upon the second level priority of the remaining ESG carousels, rearranging the ESG carousels within the series of the removed carousel to be prioritized based upon their assigned second level priority value, wherein the lowest, or least prioritized, position in the series to be open; and wherein the contents of the ESG carousels already within the series of the removed carousel are not altered, thereby the repositioned carousels remain static and do not require to be updated, and
reassigning at least a portion of an ESG carousel having a different first level priority from the series of the removed carousel into the lowest position of the series of the removed carousel;
a transmitter configured to transmit the announcement carousels and ESG carousels; and
a mobile device having a receiver configured to receive the at least one announcement carousel and the ESG carousels, wherein the reception of the ESG carousels is based upon the assigned first level and second level of priority, the mobile device further having a processor configured to process the received ESG fragments.

15. The system of claim 14, further comprising a display configured to display an output generated by processing the ESG fragments received at the mobile device.

16. An apparatus comprising:
a service source having a plurality of ESG fragments having programming information stored on a computer readable medium, the computer readable medium further having computer-executable instructions that are configured to cause an apparatus to perform at least the following:
arranging the ESG fragments into ESG carousels and prioritizing the carousels, wherein the arrangement of carousels is determined by at least a first level of priority and a second level of priority, wherein the carousels having the same first level of priority are arranged in a series, wherein at least one level of priority is determined by a time period the programming information within the enclosed ESG fragments refers to; and
creating a first announcement carousel comprising priority information of the ESG carousels, wherein the priority information is determined by at least the first and second level of priority information;
creating a second announcement carousel, wherein the second announcement carousel comprises priority information indicating at least one carousel announced in the first announcement carousel has been removed and no longer being transmitted from the transmitter and further comprising information updating at least one aspect of the priority information of at least one ESG carousel announced in the first announcement carousel;
based upon the second level priority of the remaining ESG carousels, rearranging the ESG carousels within the series of the removed carousel to be prioritized based upon their assigned second level priority value, wherein the lowest, or least prioritized, position in the series to be open; and wherein the contents of the ESG carousels already within the series of the removed carousel are not altered, thereby the repositioned carousels remain static and do not require to be updated, and
reassigning at least a portion of an ESG carousel having a different first level priority from the series of the removed carousel into the lowest position of the series of the removed carousel; and a transmitter configured to transmit the announcement carousels and ESG carousels.

17. The apparatus of claim 16, wherein the determination for the first level priority value comprises information relating to the number of ESG fragments within each carousel of the series.

18. The apparatus of claim 16, wherein the determination for the second level priority value comprises information relating to the number of ESG fragments within each carousel of the series.

19. The apparatus of claim 16, wherein the assignment of the second level priority value is based, at least in part, on information regarding a time period the programming information within the enclosed ESG fragments refers to.

20. The apparatus of claim 16, wherein the reassigned carousel is assigned a second level priority value indicating the reassigned carousel is the last carousel in the series to which it has been reassigned to.

* * * * *